Nov. 29, 1966  G. D. COOPER  3,288,989
LIGHT UNIT

Filed March 20, 1964  3 Sheets-Sheet 1

INVENTOR.
GEORGE D. COOPER
BY
Mangell, Johnston, Cook & Root
ATTORNEYS

Nov. 29, 1966   G. D. COOPER   3,288,989
LIGHT UNIT

Filed March 20, 1964   3 Sheets-Sheet 2

INVENTOR.
GEORGE D. COOPER
BY
Mazell, Johnston, Cook & Root
ATTORNEYS

Nov. 29, 1966  G. D. COOPER  3,288,989

LIGHT UNIT

Filed March 20, 1964  3 Sheets-Sheet 3

INVENTOR.
GEORGE D. COOPER

BY
Mazall, Johnston, Cook & Root

ATTORNEYS

United States Patent Office
3,288,989
Patented Nov. 29, 1966

3,288,989
LIGHT UNIT
George D. Cooper, 1136 Vista Place, Edmonds, Wash.
Filed Mar. 20, 1964, Ser. No. 353,418
13 Claims. (Cl. 240—11.4)

This invention relates in general to a light unit, and more particularly to a light unit that may be employed in combination with any other device where it is desired to have a color-corrected source of light and/or a source of light with the infrared energy removed therefrom, and still more particularly to a light unit that is capable of using the infrared energy to reduce the power input thereto.

The present invention generally includes a light unit having means defining or providing a source of radiant energy, and a tubular wraparound reflector surrounding the source. More particularly, the source would provide both visible and infrared radiant energies. Or it may be said that the source provides visible and invisible radiant energies. While the source may take any desired form, it may for example be defined by a filament lamp, a gas vapor lamp, a carbon arc lamp, or a pulsed small Xenon arc lamp. The tubular reflector would in all instances consist of a transparent carrier having a coating thereon capable of selectively reflecting and transmitting radiant energies. While the transparent carrier would preferably be of a suitable glass, it may also be of plastic or any other suitable material if so desired. Moreover, while the coating may be of any suitable type, it is preferable that it be of a multiple-layer, thin film type where it is desired to reflect and transmit certain radiant energies. A satisfactory type of multiple-layer, thin film coating is constructed of multiple layers of alternately high and low index of refraction, while the material employed may vary considerably. An example of a suitable material would be the use of alternate layers of silicon dioxide and titanium dioxide. Such a material is considered to define a dielectric coating, and also considered as a dichroic coating. In the present invention, the coating would be arranged on the inner surface of the carrier or the surface facing the source of radiant energy, and where desired the outer surface of the carrier may be conditioned to diffuse the radiant energies transmitted through the coating and carrier. The cross-sectional shape of the reflector may be arcuate or polygonal, and the opposite open ends may be left open or enclosed depending upon the nature of use desired for the unit. If the reflector has a circular cross section, it may be either cylindrical or frusto-conical.

Accordingly, it is an object of the present invention to provide a light unit capable of providing color-corrected and cool light.

Another object of this invention is in the provision of a light unit having a source of radiant energy surrounded by a tubular wraparound reflector consisting of a transparent carrier having a coating of material on the surface facing the source of energy that is capable of selectively reflecting and transmitting the radiant energies issuing from the source.

Still another object of this invention resides in the provision of a light unit having a source of visible and infrared radiant energies surrounded by a tubular reflector consisting of a transparent carrier and a coating thereon for selectively reflecting and transmitting the radiant energies issuing from the source, and wherein the cross-sectional shape o fthe reflector may be arcuate or polygonal.

A further object of this invention is to provide a light unit having a source of visible and infrared radiant energies surrounded by a tubular wraparound reflector having a coating thereon for reflecting substantially all of the infrared radiant energies and transmitting substantially all of the visible radiant energies, and wherein the reflector may be cylindrical, frusto-conical, or of any other desired shape.

Another object of this invention is in the provision of a light unit having a source of visible and infrared radiant energies surrounded by a tubular wraparound reflector consisting of a plurality of segments, wherein each segment includes a transparent carrier capable of transmitting substantially all of the visible and infrared radiant energies and a coating on the surface of the carrier facing the source for transmitting substantially all of the visible radiant energies and reflecting substantially all of the infrared radiant energies.

Still another object of this invention is to provide a light unit including means defining a source of radiant energies that is surrounded by a tubular warparound reflector having a coating on the inner surface for reflecting a part of the radiant energies and transmitting the other part of the radiant energies, and wherein the outer surface of the reflector is conditioned to diffuse the radiant energies transmitted through the coating and carrier.

Still another object of the present invention is to provide a light unit capable of being mounted in a reflector that reflects all of the radiant energies impinged thereon, wherein the light unit not only provides color-corrected light but also enables the redutcion of the power input thereto.

Other objects, feaurtes and advantages of the invention will be apparent from the following detailed disclosure, taken in conjunction with hte accompanying sheets of drawings, wherein like reference numerals refer to like parts, in which.

Figure 1:
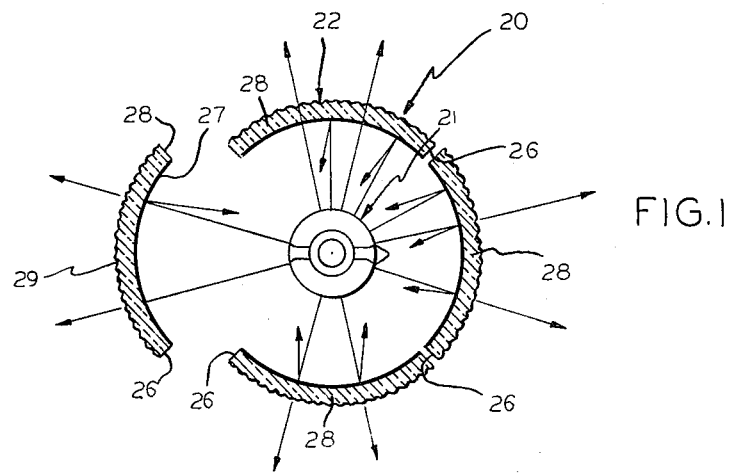
FIG. 1 is an exploded cross-sectional view of a light unit constructed in accordance wtih the invention.
Figure 2:
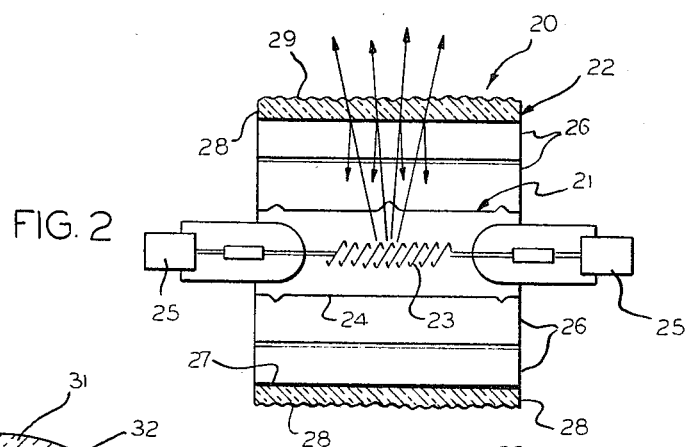
FIG. 2 is an axial sectional view of the embodiment of FIG. 1.

Referring now to the drawings and particularly to FIGS. 1 and 2, a light unit 20 according to the present invention includes generally a source of radiant energies 21 and a tubular wraparound reflector 22.

The soure of radiant energies 21 illustrated comprises a quartz-iodine lamp of the well known type, wherein effectively a line source of radiant energies is defined by a tungsten filament 23 hermetically enclosed in a quartz envelope 24. A supply of iodine in vapor form is also provided within the quartz envelope 24 to enable the iodine cycling process. Bases 25 are provided at opposite ends of the envelope 24 for connecting the lamp to a source of electrical potential. Thus a filament lamp is illustrated in use in the embodiment of FIGS. 1 and 2, and will generally be illustrated in the other embodiments, although it must be appreciated that any other suitable source of radiant energy may be provided. In nearly every instance however, the source will provide both visible and infrared radiant energy.

The reflector 22 is segmented and defined by a plurality of segments or sections 26. While four segments 26 are shown in the embodiments of FIGS. 1 and 2, it should be appreciated that any greater or lesser number may be provided depending upon the desires of the user or particular problems involved. In any event, the segments should be of slight arcuate extent so that even deposition of a coating 27 may be applied to the inner surface of each segment or the surface facing the source of radiant energies 21. The segments 26 are elongated and each comprises in the illustration shown approximately one-fourth of the entire reflector 22. Further, each segment includes a transparent carrier 28 upon which the coating 27 is mounted. While as heretofore mentioned, the carrier may be of any suitable material that is capable of transmitting substantailly all of the visible and infrared radiant energies, and any of the other radiant energies, it has been found that the carrier should preferably be of glass. Moreover, it should be of a glass that is endowed with such optical qualities as to be capable of transmitting substantially all of the radiant energies issuing from the source 21, so that control of the radiant energies desired to be transmitted therethrough is accomplished by the coating 27 thereon.

As already mentioned, the coating 27 may preferably be of the type that is capable of selectively transmitting and/or reflecting certain of the radiant energies. Such a coating may be a film of multiple layers of material of alternately high and low indexes of refraction, wherein the material may be of silicon dioxide and titanium dioxide, or any other composition suitable for the making of thin films. Such a coating may be applied by thermal evaporation in a vacuum chamber, or by any other suitable method.

The invention is primarily concerned with a coating that is capable of reflecting the infrared radiant energies and of transmitting the visible radiant energies in such a manner as to provide a color-corrected light. In some instances, the coating would be designed to define a selected visible color light or a light having a high Kelvin temperature.

The reflector segments 26 may be arranged in abutting relation or in slightly spaced relation in order to provide circulation of heat through the sides of the reflector. If the segments are in tight abutting relation, the heat may pass through the opposite open ends of the reflector. Further, the reflector may be arranged in horizontal position as shown in FIG. 2 or it may be arranged in vertical position as illustrated in connection with a sign structure in FIG. 13.

The external surface of the segments 26, this being the surface that is remote from the energy source 21, is suitably conditioned as indicated by the numeral 29 to diffuse and control the visible radiant energy transmitted through the coating 27 and the carrier 28. It should be appreciated that where diffusion is desired, any type of diffusing surface may be employed depending upon the needs of the user, and that the diffusing surface on one segment may be different from that on another segment in order to carry out a specific light control application. In fact, the diffusing surface on a single segment may be such as to direct the visible energy issuing therefrom in any number of directions.

As already explained, inasmuch as the infrared radiant energy is reflected from the coating 27 and essentially back to the source 21, where a filament is involved such as shown in the embodiment of FIG. 2, this radiant energy will tend to increase the temperature of the filament thereby permitting a lower power input to the filament while at the same time bringing the temperature up to a desired efficiency. Normally, the infrared radiant energy given off by a filament is wasted by being transmitted away therefrom. Further, inasmuch as the infrared radiant energy is not transmitted through the carrier 28, it will permit operation of the carrier at a lower temperature.

Figure 3:
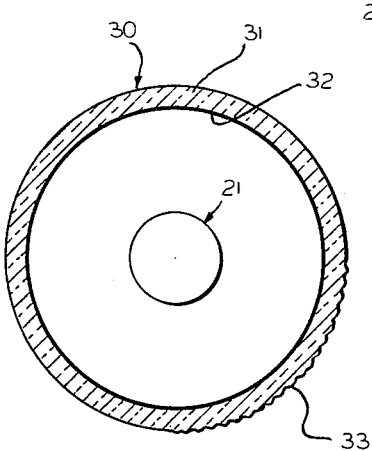
FIG. 3 is a transverse cross-sectional view of a modification of the embodiment of FIGS. 1 and 2 wherein the reflector is of one piece and provided along its exterior surface with means for only partially conditioning the visible radiant energies transmitted through the carrier and coating.

Referring now to the embodiment of FIG. 3, a cylindrical reflector 30 surrounds the source of radiant energy 21 and includes a one-piece, transparent substrate or carrier 31 having a coating 32 on the inner surface thereof. The coating 32 functions in the same manner as the coating 27 of the embodiment of FIGS. 1 and 2 in that it primarily reflects the infrared radiant energy issuing from the source 21, while transmitting the visible radiant energies or a portion thereof. This embodiment also illustrates that only a portion of the external surface of the transparent carrier may be conditioned for specific projection of the radiant energies transmitted through the coating and carrier by the provision of the diffusing section 33.

Figure 4:
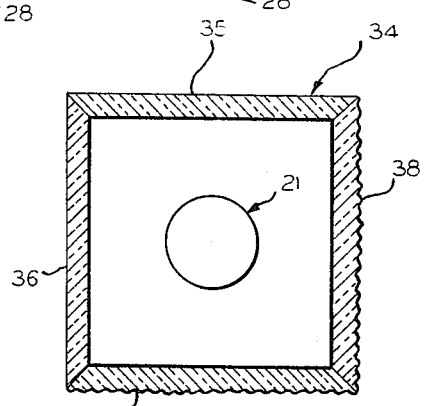
FIG. 4 is a transverse cross-sectional view of a further modification of the invention and illustrating a rectangular cross section for the tubular wraparound reflector.

A further embodiment of the invention is shown in FIG. 4 wherein a rectangular, and in this instance square reflector 34 surrounds the source of radiant energy 21. This reflector 34 includes four flat segments 35, 36, 37 and 38 fitted together in abutting relation to form the square reflector. As in the other embodiments, each segment includes a transparent carrier having a coating on the inner surface facing the source of energy 21 for reflecting some of the radiant energies and transmitting other of the radiant energies. Moreover, the segments 37 and 38 are further provided with diffusing means on their exterior surfaces for controlling of the light energy transmitted through the coating and carrier.

Figure 5:
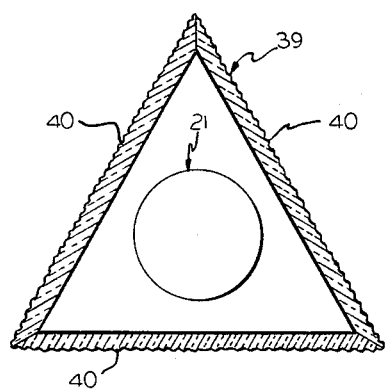
FIG. 5 is a transverse cross-sectional view of still another modification of the invention wherein the wraparound reflector is triangularly shaped.

The embodiment of FIG. 5 differs from the other embodiments in that the reflector 39 is triangularly shaped in cross section and composed of three flat segments 40 fitted together in surrounding relation to the source of radiant energy 21. Again, the surface of each segment facing the source of energy 21 is coated to selectively reflect and transmit certain of the radiant energies issuing from the source 21, while the external surface is conditioned to diffuse the light transmitted through the coating and carrier.

Figure 6:
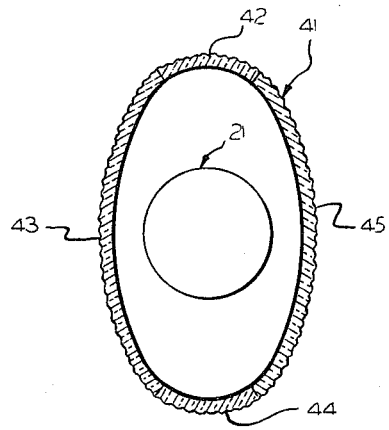
FIG. 6 is a transverse cross-sectional view of a further embodiment of the invention wherein the reflector is oval or elliptical in cross-sectional shape.

The cross-sectional shape of the reflector 41 in the embodiment of FIG. 6 is oval or elliptical, and this reflector includes segments 42, 43, 44 and 45 arranged together to surround the source of radiant energy 21. It may be noted that the arcuate extent of the segments is slight so that even deposition of a coating thereon may be accomplished for providing the most efficient selection of the radiant energies reflected and transmitted therethrough. Again the sections are coated on the side facing the source 21 and provided with a diffusing surface on the exterior side in accordance with the invention.

Figure 7:
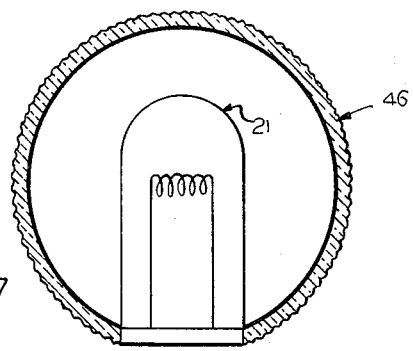
FIG. 7 is a cross-sectional view of a still further embodiment of the present invention, wherein the reflector is spherical in cross-sectional shape.

Referring now to the embodiment of FIG. 7, a generally spherical reflector 46 is shown in surrounding relationship to the source of radiant energy 21. While this reflector is shown in one piece, it can be appreciated that it may be segmented for coating purposes if so desired. However, the reflector would include a transparent carrier having a selective wave length coating on the inner surface and a diffusing means on the outer surface as in the other embodiments.

Figure 8:
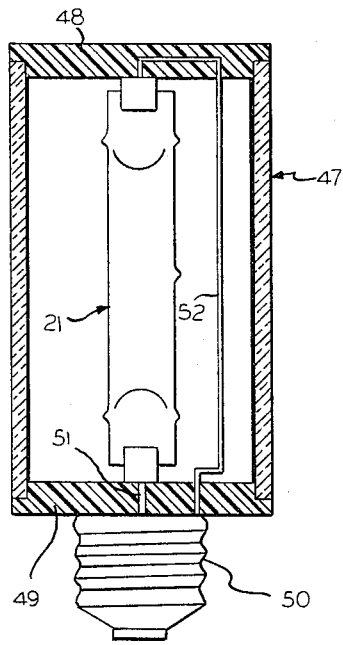
FIG. 8 is an axial sectional view of a further embodiment of the invention, illustrating the lamp unit modified to be usable in a threaded electrical socket.

The embodiment of FIG. 8 illustrates the manner in which any of the embodiments having open opposite ends may be modified to permit the unit to be used in an electrical socket, wherein the reflector 47 is provided with opposite end plates 48 and 49 closing at opposite open ends of the reflector. The end plates 48 and 49 also provide a means for holding the source 21 which may be a filament lamp or the like. A threaded base 50 is also mounted on the lower end plate 49 and connected to the lamp 21 by wires 51 and 52. The end plates 48 and 49 may either be tightly fitted with respect to the reflector 47 or sealed relative thereto.

Figure 9:
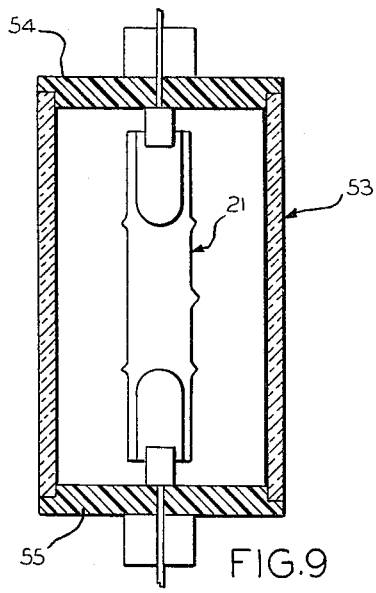
FIG. 9 is an axial sectional view of a still further embodiment of the invention illustrating end panels sealing the opposite ends of the tubular reflector to define a hermetically sealed envelope for the source of radiant energy.

The embodiment of FIG. 9 is similar to the embodiment of FIG. 8 in that the reflector 53 is of the type of the other embodiments having open opposite ends, and wherein upper and lower end panels 54 and 55 are provided to close off and seal the opposite ends of the reflector 53. If so desired, this light unit may also be such as to hermetically seal the source 21 within the reflector 53. In this instance, the reflector 53 may either be one piece or sectional. If the reflector is sectional, the sections may be sealed together with an epoxy or any other suitable material, and similarly the end plates 54 and 55 may be sealed to the opposite ends of the reflector 53 by an epoxy or suitable material. Again, the reflector 53 would have the general characteristics of the reflectors heretofore specifically described in connection with the other embodiments.

While the end plates 48, 49, 54 and 55 of the embodiments of FIGS. 8 and 9 are shown to be of plastic or insulating material, it should be understood that they could be metal, ceramic, glass or of any other suitable material.

Figure 10:
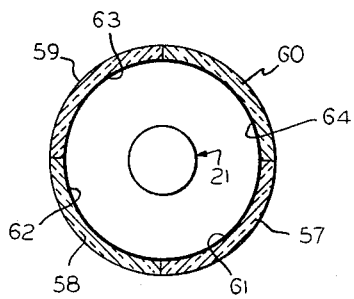
FIG. 10 is a transverse sectional view taken through a reflector constructed in accordance with the present invention wherein the reflector is segmented and provided with coatings of different types in order to selectively transmit and reflect the radiant energies issuing from the source.

Referring now to FIG. 10, another embodiment of the invention is illustrated wherein a reflector 56 includes segments 57, 58, 59 and 60 arranged together and formed to define a cylindrical reflector in surrounding relation to the source of radiant energy 21. While the external surfaces of these segments may or may not be provided with a diffusing means, for purposes of simplicity, they are shown as not having such means. This embodiment differs in that the coating provided on the segment 57 and indicated by the numeral 61 is such as to reflect substantially all of the infrared radiant energies and transmit part or all of the visible radiant energies, while the coatings 62, 63 and 64 on the segments 58, 59 and 60, respectively, are such as to reflect substantially all of the visible and infrared radiant energies. In this embodiment, it would only be desirous of having the visible radiant energies transmitted through the segment 57. Similarly, any number of segments may be constructed like 57, while any number may be constructed like 58, 59 and 60.

Figure 11:
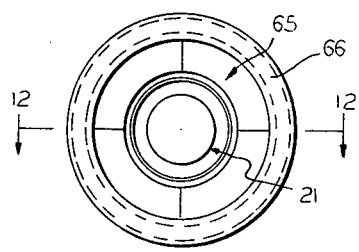
FIG. 11 is a top plan view of a further embodiment of the present invention but only illustrating the tubular wraparound reflector.
Figure 12:
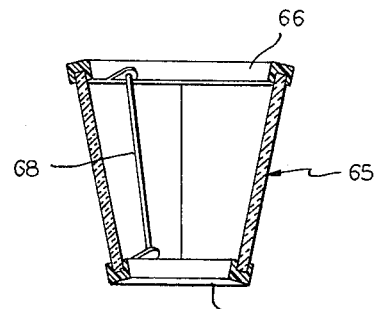
FIG. 12 is an axial sectional view taken through the embodiment of FIG. 11 and substantially along line 12—12 thereof.

FIGS. 11 and 12 show another embodiment wherein a reflector 65 is provided that differs from the reflector 22 of the embodiment of FIGS. 1 and 2 only in that it is frusto-conical in shape. Again the reflector may be segmented, and upper and lower ring-shaped holders 66 and 67 are shown to receive the opposite ends of the reflector segments, and connecting rod means 68 is provided to connect the holders together to hold the segments of the reflector in position.

Figure 13:
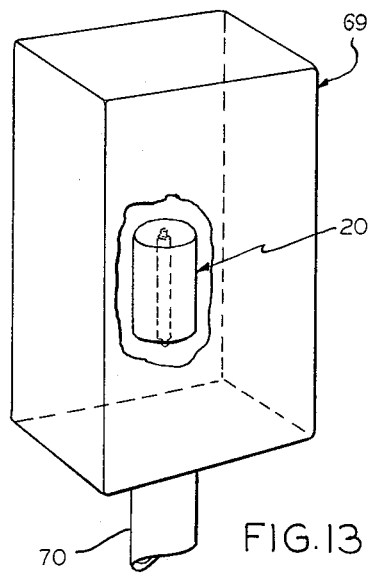
FIG. 13 is a somewhat diagrammatic perspective view of a dual-faced sign structure employing a light unit in accordance with the present invention, and particularly the embodiment of FIGS. 1 and 2.

While the light unit of the present invention may be employed for use by itself, a specific use application is shown in FIG. 13 wherein the light unit 20 of FIGS. 1 and 2 is diagrammatically shown to be mounted within a two-sided sign structure 69 supported on the upper end of a post 70. The sign structure could be of the well known type having opposed translucent plastic faces with appropriate lettering or symbolization thereon wherein the light source of the unit 20 would provide the necessary illumination of the sign. Inasmuch as the light unit would provide color-corrected light, any color provided on the plastic sides of the sign would show up clearly and brightly despite the time of day when the sign structure is operated. Moreover, heat which might be injurious to the side faces of the sign structure could be channeled to another part thereof and expelled from the structure.

Figure 14:
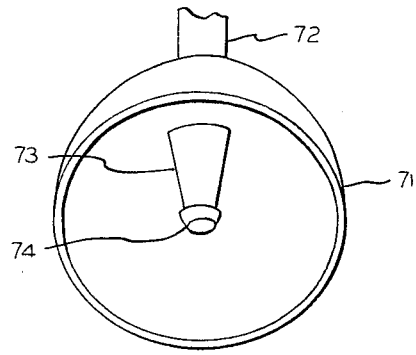
FIG. 14 is a perspective view of a light fixture employing a light unit according to the present invention and particularly the embodiment of FIGS. 10 and 11.

Another application use of the present invention is shown in FIG. 14 wherein a deep-dished, metallic reflector 71 suspended from a support 72 has mounted therein a light unit 73 of the type shown in FIGS. 11 and 12. Specifically, such a unit may be employed for surgical operations or medical examination wherein it would be desired to have a color-corrected light without heat. Thus the light unit 73 would color correct the visible radiant energies reflected from the reflector 71 and also prevent the infrared radiant energies from hitting the reflector 71. Suitable means may be provided for venting the upper end of the unit to allow the heat building up in the light unit 73 to escape. A suitable cover or cap 74 would be provided at the lower end of the reflector of the light unit 73 in order to prevent any light from issuing through the lower end of this unit.

It will be understood that modifications and variations may be effected without departing from the scope of the novel concepts of the present invention, but it is understood that this application is to be limited only by the scope of the appended claims.

The invention is hereby claimed as follows:

1. A light unit comprising, means defining a source of radiant energies, a tubular wrap-around reflector surrounding said source, said reflector including a plurality of segments of a transparent carrier, said segments being slightly spaced from each other to define an opening between adjacent segments, each segment having a coating on all of one surface thereof selectively reflecting one part of the radiant energies and selectively transmitting the other part of the radiant energies, and opaque closure means at each end of said reflector closing same.

2. A light unit as defined in claim 1, wherein said coating is on the surface of the segments facing said source.

3. A light unit as defined in claim 2, and means on the outer surface of at least one of said segments diffusing the radiant energies transmitted therethrough.

4. A light unit as defined in claim 1, wherein said reflector is cylindrical.

5. A light unit as defined in claim 1, wherein said reflector is polygonal.

6. A light unit as defined in claim 1, wherein said reflector is elliptical.

7. A light unit as defined in claim 1, wherein said reflector is frusto-conical.

8. A light unit as defined in claim 1, wherein said segments are flat.

9. A light unit as defined in claim 1, wherein said segments are curvate.

10. A light unit as defined in claim 1, and base means on one of said closure means electrically connected to said source to adapt the unit for mounting in an electric socket.

11. A light unit as defined in claim 1, wherein the coating on at least one segment reflects substantially all of the infrared radiant energies and transmits substantially all of the visible radiant energies, while the coating on at least one other segment transmits substantially all of the infrared radiant energies and reflects substantially all of the visible radiant energies.

12. In combination with a sign structure having a hollow body with opposed translucent panels adapted to have colored legends and printing thereon, a light unit arranged within said body between the panels for illuminating same, said light unit comprising, means defining a source of visible and infrared radiant energies, a tubular wrap-around reflector surrounding said source, and said reflector including a transparent carrier capable of transmitting substantially all of the visible and infrared radiant energies and a thin film coating on the surface of the reflector facing said source reflecting substantially all of said infrared radiant energies and directing them back to the source and transmitting substantially all of said visible radiant energies.

13. In combination with a deep-dished metallic reflector, a light unit arranged at the bottom of said reflector to issue color-corrected and cool visible radiant energies to said reflector, said light unit comprising, means defining a source of visible and infrared radiant energies, a tubular wrap-around reflector surrounding said source, and said reflector including a transparent carrier capable of transmitting substantially all of the visible and infrared radiant energies and a thin film coating on the surface of the reflector facing said source reflecting substantially all of said infrared radiant energies and directing them back to the source and transmitting substantially all of said visible radiant energies.

References Cited by the Examiner
UNITED STATES PATENTS

| | | |
|---|---|---|
| 2,293,672 | 8/1942 | Bookman. |
| 2,382,939 | 8/1945 | Koch _____ 240—11.4 X |
| 2,660,925 | 12/1953 | Turner. |
| 2,798,943 | 7/1957 | Prideaux _____ 240—47 |
| 3,099,403 | 7/1963 | Strawick _____ 240—47 |
| 3,174,067 | 3/1965 | Bahrs _____ 240—47 X |
| 3,188,513 | 6/1965 | Hansler _____ 313—110 X |

NORTON ANSHER, *Primary Examiner.*

C. R. RHODES, *Assistant Examiner.*